United States Patent
Chang et al.

(10) Patent No.: US 9,229,817 B2
(45) Date of Patent: Jan. 5, 2016

(54) CONTROL METHOD OF DATA STORAGE SYSTEM FOR RESTARTING EXPANDER

(71) Applicant: Wistron Corp., New Taipei (TW)

(72) Inventors: Shih-Hui Chang, New Taipei (TW); Ming-Sheng Wu, New Taipei (TW); Chieh-Yi Lin, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/178,191

(22) Filed: Feb. 11, 2014

(65) Prior Publication Data

US 2015/0089133 A1     Mar. 26, 2015

(30) Foreign Application Priority Data

Sep. 26, 2013  (TW) .............................. 102134698 A

(51) Int. Cl.
  *G06F 3/00*   (2006.01)
  *G06F 13/12*  (2006.01)
  *G06F 11/14*  (2006.01)

(52) U.S. Cl.
  CPC .................................. *G06F 11/1441* (2013.01)

(58) Field of Classification Search
  None
  See application file for complete search history.

(56) References Cited

U.S. PATENT DOCUMENTS

| | | | |
|---|---|---|---|
| 6,680,952 B1* | 1/2004 | Berg et al. | 370/467 |
| 7,023,642 B2* | 4/2006 | Suzuki et al. | 360/71 |
| 7,221,531 B2* | 5/2007 | Duerk et al. | 360/69 |
| 7,474,926 B1* | 1/2009 | Carr et al. | 700/19 |
| 7,584,368 B2* | 9/2009 | Nichols et al. | 713/300 |
| 8,074,149 B2 | 12/2011 | Stolowitz | |
| 8,112,564 B2* | 2/2012 | Duerk et al. | 710/62 |
| 2003/0115413 A1* | 6/2003 | Wood et al. | 711/114 |
| 2006/0061369 A1* | 3/2006 | Marks et al. | 324/542 |
| 2008/0266815 A1* | 10/2008 | Leigh et al. | 361/730 |

FOREIGN PATENT DOCUMENTS

| | | |
|---|---|---|
| TW | 200639640 A | 11/2006 |
| TW | 201335738 A1 | 9/2013 |

OTHER PUBLICATIONS

Taiwan Patent Office, Office Action, Patent Application Serial No. 102134698, Feb. 10, 2015, Taiwan.

* cited by examiner

*Primary Examiner* — David E Martinez

(57) ABSTRACT

The present disclosure discloses a data storage system and a control method thereof. The data storage system includes a plurality of data storage devices, a temporary memory device and an expander. The control method includes: detecting, by the expander, if a flag is in a first status after the expander is restarted; sending, by the expander, a first command to all the data storage devices if the first status is detected. The first status indicates that all the data storage devices are ready for linking and operation.

14 Claims, 3 Drawing Sheets

CONTROL METHOD OF DATA STORAGE SYSTEM FOR RESTARTING EXPANDER

BACKGROUND OF THE DISCLOSURE

1. Field of the Disclosure

The disclosure relates to a control method for a data storage system, and more particular to the control method of data storage system when the expander is restarted.

2. Description of the Related Art

Compared to data storage devices of the past, data storage devices nowadays have the advantages of enhanced data integration, enhanced fault tolerance and larger processing capacity or storage capacity. A Redundant Array of Independent Disks (RAID) combines a plurality of cheaper disks so that its efficiency is better than a disk which is more expensive and has a larger storage capacity. As shown in FIG. 1, a disk system 120 includes at least one expander 121 and a plurality of disk groups 122 to 126 and a server system 110 includes a server 111 and a RAID control device 112. The expander 121 is coupled to the disk groups 122 to 126 and the RAID control device 112.

The disk system 120 and the expander 121 need to be restarted under the watchdog timeout warning mechanism of the expander 121 when unpredictable factors cause the disk system 120 to fail to operate normally. When the expander 121 is restarted, taking into consideration the instantaneous current, the expander 121 needs to supply power to the disk groups 122 to 126 of the disk system 120 sequentially and individually to avoid power to the disk system 120 being tripped off. It leads to more than one minute spent waiting for all the disk groups 122 to 126 of the disk system 120 are completely ready.

However, the time spent on the error-handling mechanism of the RAID control device 112 cannot exceed one minute when the disk system 120 has failed to operate normally because of the unpredictable factors. If the time spent waiting for all the disk groups 122 to 126 be completely ready exceeds the time spent on the error-handling mechanism of the RAID control device 112, the RAID control device 112 would determine that the unready disk groups are damaged. That causes damage to user data (for example, Facebook, Rackspace, Google . . . etc.). Therefore the present disclosure provides a disk system and a control method thereof to solve the above problem.

BRIEF SUMMARY OF THE DISCLOSURE

An embodiment of the present disclosure provides a control method for a data storage system. The data storage system includes a plurality of storage devices, a temporary memory device and an expander. The control method includes detecting whether a flag is in a first status by the expander after the expander is restarted and sends a first command to all the data storage devices when the first status is detected, wherein the flag is stored in the temporary memory device.

An embodiment of the present disclosure provides a data storage system. The data storage system includes a plurality of storage devices, a temporary memory device and an expander. The temporary memory device stores a flag. When all the data storage devices are ready, the flag is set to a first status. The expander is coupled to the data storage devices. When ed the flag detected by the expander is in the first status, the expander sends a first command to all the data storage devices after the expander is restarted.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

Figure 1:
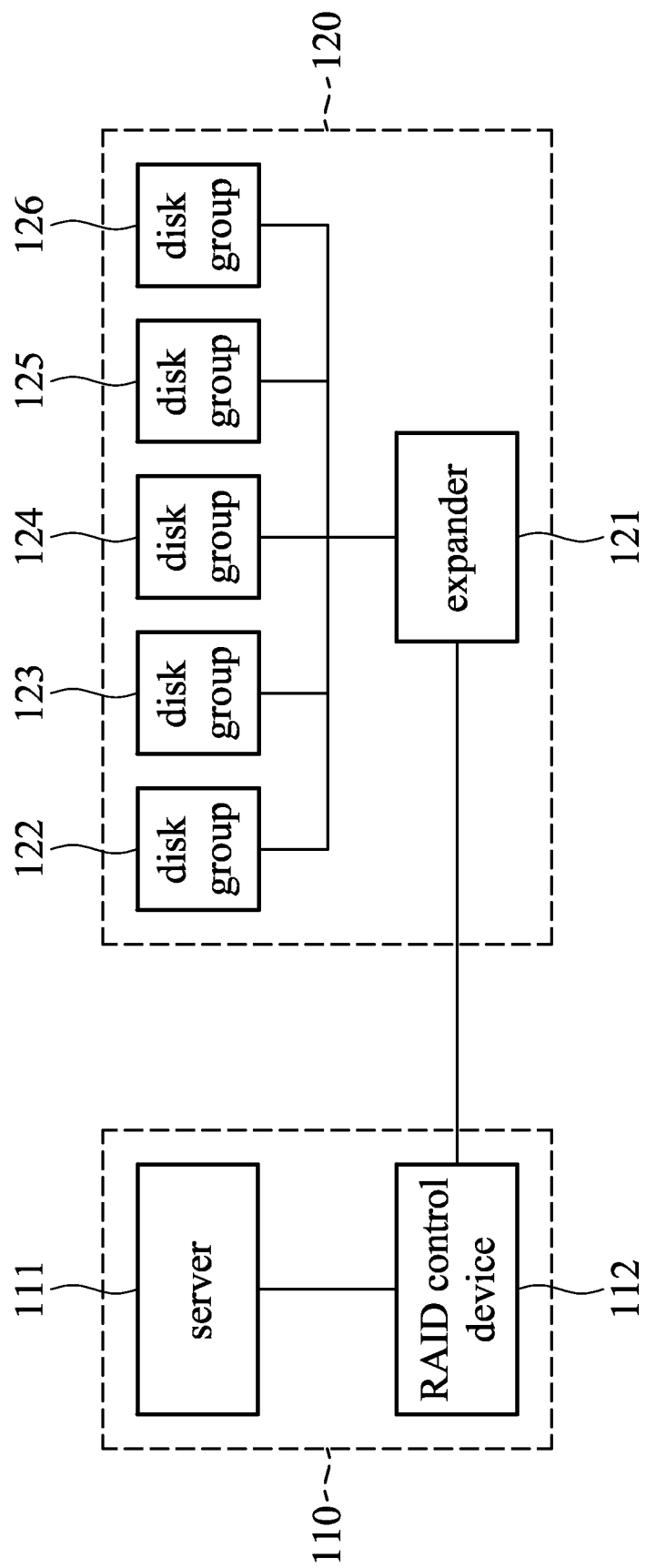
FIG. 1 illustrates a block diagram of the connection between the server system 110 and the disk system 120.
Figure 2:
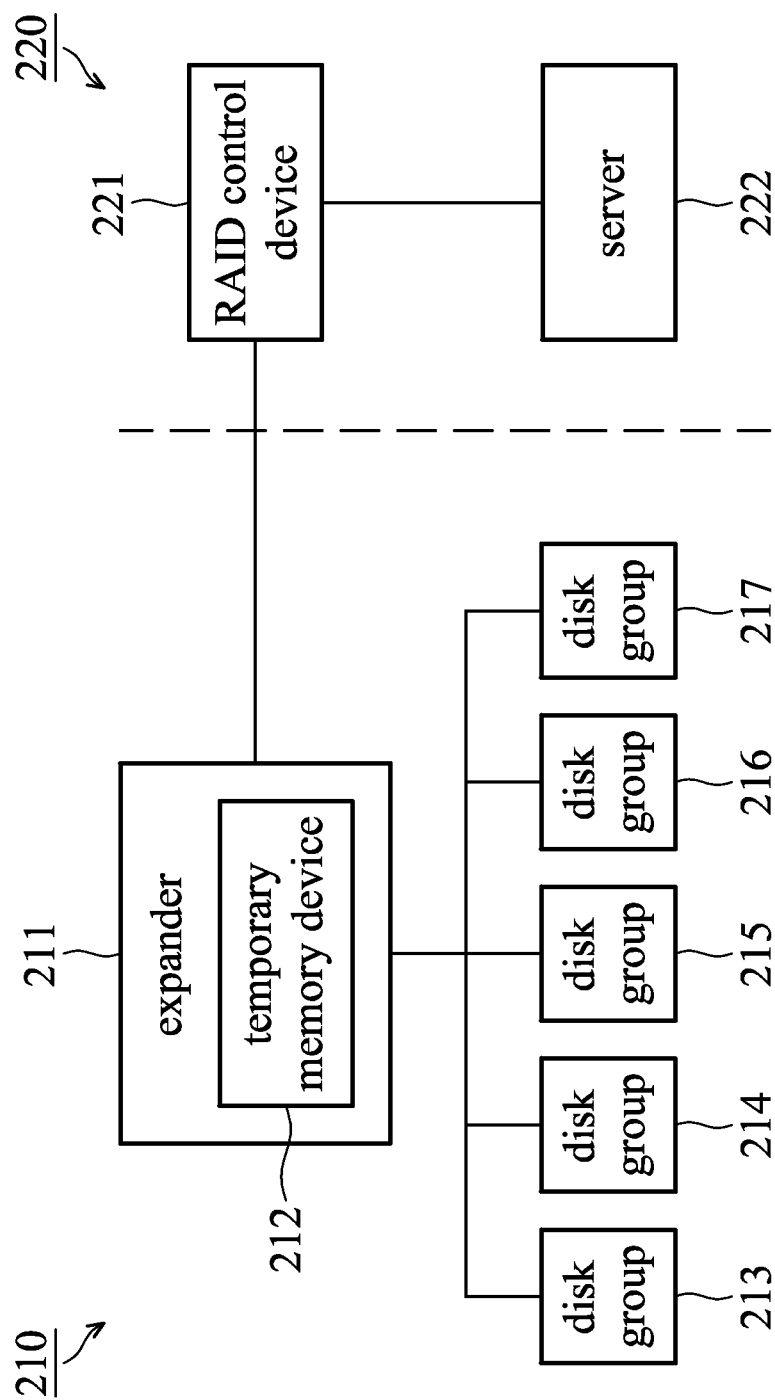
FIG. 2 shows a block diagram of a server system 220 and a disk system 210 of the present disclosure.

The following description is of the best-contemplated mode of carrying out the disclosure. This description is made for the purpose of illustrating the general principles of the disclosure and should not be taken in a limiting sense. The scope of the disclosure is best determined by reference to the appended claims As per the embodiment shown in FIG. 2, a data storage system of the present disclosure can be a disk system 210 and a server system 220; but it is not limited thereto. In this embodiment, the disk system 210 includes an expander 211, a temporary memory device 212 and a plurality of disk groups 213 to 217. The temporary memory device 212 is disposed in the expander 211 and used to store a ready flag. The ready flag is used to indicate whether the disk groups 213 to 217 are in a ready status or not. The disk groups 213 to 217 are coupled to the expander 211 and each disk group includes at least one disk. For example, each disk group is constituted by three SATA hard disks in this embodiment. The server system 220 includes a RAID control device 221 and a server 222. The RAID control device 221 which is coupled to the expander 211 is used to receive the information of the disk system 210. The server 222 is coupled to the RAID control device 221.

When unpredictable factors cause the disk system 210 cannot operate normally, the disk system 210 and the expander 211 may be restarted in a situation in which the power of the disk system 210 is not off. At the moment of restarting, the expander 211 detects whether the ready flag is in the ready status or not. If the ready flag detected by the expander 211 is in the ready status, the expander 211 sends a link-reset instruction (such as a "comreset" instruction) to all the disk groups 213 to 217 simultaneously and informs the RAID control device 221 that all the disk groups 213 to 217 are ready. The link-reset instruction is used to inform the disk group resets and informs the expander when the disk group is ready.

If the ready flag detected by the expander 211 is not in the ready status, then the expander 211 sends the link-reset instruction to the disk group 213. When the disk group 213 is ready, the expander 211 sends the link-reset instruction to the next disk group 214 and repeats the same steps until all the disk groups 213 to 217 are ready. The expander 211 informs the RAID control device 221 that all the disk groups 213 to 217 are ready. At this moment, the expander 211 sets the ready flag to the ready status and stores the ready flag into the temporary memory device 212.

Figure 3:
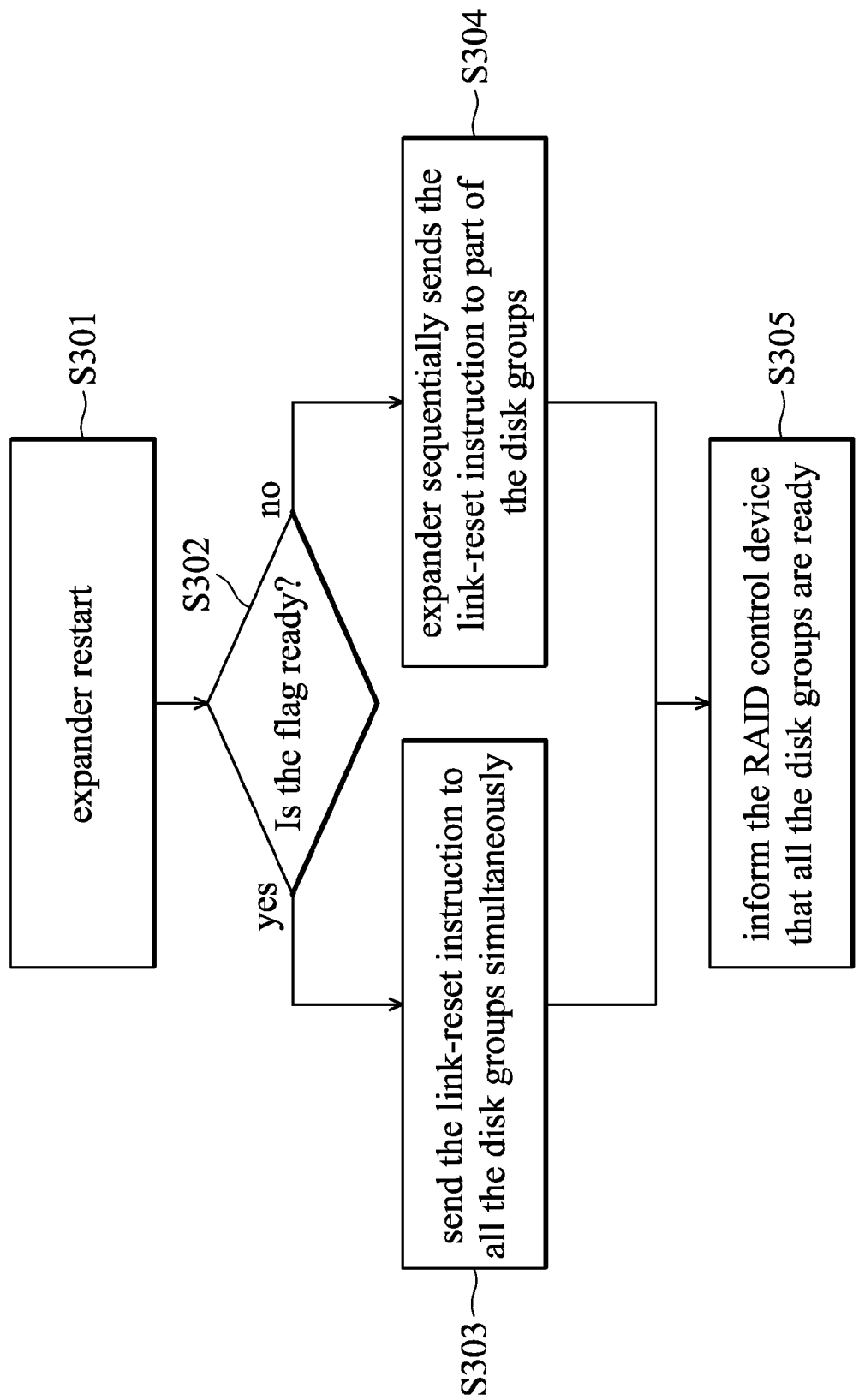
FIG. 3 shows a flow diagram to illustrate the control method of the disk system of the present disclosure.

As per the embodiment shown in FIG. 3, the control method of the data storage system of the present disclosure is a control method of the disk system; but it is not limited thereto. FIG. 3 shows a flow diagram to illustrate the control method of the disk system, depicted in FIG. 2, according to an embodiment of the present disclosure. In step S301, the disk system 210 and the expander 211 are restarted when the power of the disk system 210 is not off. In step S302, the expander 211 detects whether the ready flag is in the ready status or not. If the ready flag is detected in the ready status, then the method proceeds to step S303, otherwise, going to the step S304. In step S303, the expander 211 sends the link-reset instruction to all the disk groups 213 to 217 simultaneously. When all the disk groups 213 to 217 are ready, going to step S305.

In step S304, the expander 211 sequentially sends the link-reset instruction to all the disk groups 213 to 217, wherein the expander 211 would wait for the disk group 213 is ready, send the link-reset instruction to the next disk group 214 and repeat the above actions until all the disk groups 213 to 217 are ready. After all the disk groups 213 to 217 are ready, the expander 211 sets the ready flag to the ready status and stores the ready flag into the temporary memory device 212, then going to step S305. At step S305, the expander 211 informs the RAID control device 221 that all the disk groups 213 to 217 are ready.

In the above embodiment, the control method of the disk system of the present disclosure is performed by the expander 211, but is not limited thereto. Additionally, it is noticeable that the ready status of the ready flag in the temporary memory device 212 will be clear when the power to the disk system 210 is tripped-off. Therefore the ready flag stored in the temporary memory device 212 is not in the ready status when the power of the disk system 210 is turned on. At the moment of restarting, the disk system 210 performs the same actions in the steps S304 and S305.

After applying the control method of the disclosed embodiment, the disk system 210 can know when to simultaneously send the link-reset instruction to all the disk groups 213 to 217 according to the ready status of the ready flag. Therefore the time spent for all the disk groups 213 to 217 to be ready is less than the time spent in the related art (i.e. the time spent for the expander 211 to sequentially send the link-reset instruction to all the disk groups 213 to 217 until all the disk groups 213 to 217 are ready) and is also less than the time spent for the error-handling mechanism of the RAID control device 112. Therefore the disk system 210 can avoid data damage when unpredictable factors cause the disk system 210 to fail to operate normally.

The ready flag can be used to determine whether or not the disk system 210 needs to sequentially and partially supply power to the disk groups 213 to 217 to avoid the power to the disk system 120 being tripped-off.

While the disclosure has been described by way of example and in terms of preferred embodiment, it is to be understood that the disclosure is not limited thereto. On the contrary, it is intended to cover various modifications and similar arrangements (as would be apparent to the person skilled in the art). Therefore, the scope of the appended claims should be accorded the broadest interpretation so as to encompass all such modifications and similar arrangements.

What is claimed is:

1. A control method for a data storage system, the data storage system having a plurality of storage devices, a temporary memory device and an expander, the control method comprising:
    detecting whether a flag is in a first status by the expander after the expander is restarted, wherein the flag is stored in the temporary memory device;
    when the flag is in the first status, simultaneously sending a first command to all the data storage devices by the expander; and
    when the flag is not in the first status, performing the steps of:
        sending the first command to each of the data storage devices in sequence by the expander, wherein the expander waits until each data storage device becomes ready before proceeding to a next data storage device in the sequence;
        setting the flag to the first status in response to all the data storage devices being ready; and
        storing the flag into the temporary memory device.

2. The control method of claim 1, wherein the expander is restarted when the power of the data storage system is on.

3. The control method of claim 1, wherein the expander is restarted when the power of the data storage system is not off.

4. A data storage system, comprising:
    a plurality of storage devices;
    a temporary memory device which stores a flag, when all the data storage devices are ready, the flag is set to a first status; and
    an expander coupled to the data storage devices, when the flag detected by the expander is in the first status, the expander sends a first command to all the data storage devices simultaneously after the expander is restarted; and
    when the expander detects the flag is not in the first status, the expander sends the first command to each of the data storage devices in sequence, wherein the expander waits until each data storage device becomes ready before proceeding to a next data storage device in the sequence, and then, when all the data storage devices are ready, the expander sets the flag to the first status and stores the flag into the temporary memory device.

5. The data storage system of claim 4, wherein the expander is restarted when the power of the data storage system is not off.

6. The data storage system of claim 4, wherein the expander is restarted when the power of the data storage system is not off.

7. The data storage system of claim 4, further comprising:
    a RAID (Redundant Array of Independent Disks) control device coupled to the expander; and
    a server coupled to the RAID control device;
    wherein the storage devices are provided inside the expander.

8. A control method for a data storage system, the data storage system having a plurality of storage devices, a temporary memory device and an expander; the control method comprising:
    detecting whether a flag is in a first status by the expander after the expander is restarted, wherein the flag is stored in the temporary memory device and the first status represents that all of the data storage devices are ready; and
    simultaneously sending a first command to all the data storage devices by the expander when the first status is detected, wherein the first command is a link-reset instruction.

9. The control method of claim 8, wherein the expander is restarted when the power of the data storage system is not off.

10. The control method of claim 9, wherein the expander is restarted when the power of the data storage system is on.

11. A data storage system, comprising:
    a plurality of storage devices;
    a temporary memory device which stores a flag, wherein when all the data storage devices are ready, the flag is set to a first status, the first status representing that all of the data storage devices are ready; and
    an expander coupled to the data storage devices, wherein when the flag detected by the expander is in the first status, the expander simultaneously sends a first command to all the data storage devices after the expander is restarted, wherein the first command is a link-reset instruction.

12. The data storage system of claim 11, wherein the expander is restarted when the power of the data storage system is not off.

13. The data storage system of claim 12, wherein the expander is restarted when the power of the data storage system is not off.

14. The data storage system of claim 11, further comprising:
   a RAID (Redundant Array of Independent Disks) control device coupled to the expander; and
   a server coupled to the RAID control device;
   wherein the storage devices are provided inside the expander.

* * * * *